Patented Nov. 8, 1932

1,887,201

UNITED STATES PATENT OFFICE

CECIL HAYES, OF STREETLY, AND EVELYN WILLIAM MADGE AND FREDERICK HENRY LANE, OF BIRMINGHAM, ENGLAND, ASSIGNORS TO DUNLOP RUBBER COMPANY LIMITED, OF BIRMINGHAM, ENGLAND, A BRITISH COMPANY

MANUFACTURE OF GOODS OF RUBBER OR SIMILAR MATERIAL

No Drawing. Application filed March 6, 1930, Serial No. 433,804, and in Great Britain March 8, 1929.

This invention comprises improvements in or relating to the manufacture of goods of rubber or similar material by any one or more operations such as spreading, dipping, impregnating, spraying, moulding or extruding from aqueous emulsions or dispersions of rubber or similar material of the kinds hereinafter specified, rendered capable of gelling in the cold in definite controllable time intervals, the time intervals aforesaid decreasing with increase in temperature.

The term "gelling" is meant to signify the change of state of the rubber or the like material in the aqueous dispersions from the dispersed state to the state wherein the rubber forms the continuous phase. The whole of the dispersion medium is included in the pores, capillaries or cells of microscopic or ultra-microscopic dimensions of the structure of the solid produced. The gel so formed is a strong homogeneous irreversible solid structure without pores visible to the naked eye. The microscopic or ultra-microscopic pores, capillaries or cells which contain the serum gradually become smaller or completely disappear on drying of the gel.

According to the invention it has been found that the addition of a sufficient excess of formaldehyde in one or more stages to the emulsions or dispersions over and above that required to neutralize the free alkalinity such as ammonia present, with or without the prior addition to the emulsions or dispersions of small quantities of certain hereinafter mentioned sensitizing agents or the addition of formaldehyde in amounts just sufficient to neutralize the free ammonia present to the emulsions or dispersions having the prior addition of the small quantities of certain hereinafter mentioned sensitizing agents leads to the formation of a gel in the cold in definite and controllable time intervals, the time intervals aforesaid decreasing with increase in the temperature.

In the production of a rubber gel from a concentrated non-compounded latex prepared for example, by a centrifugal process, by the addition of an excess of formaldehyde over and above that required to neutralize the free alkalinity such as ammonia present, it has been found that the latex concentrate has to be almost neutral before any formaldehyde is added if a gel is to be obtained. For one particular type of latex concentrate used it was found that the ammonia content must not exceed 0.05%.

For a latex mixing, however, from such a concentrated latex, a definite uniform gel is obtained. This gel formation is not prevented by an upper limit in the free alkalinity or ammonia content before the addition of the formaldehyde. It has been found, however, that the higher the free alkalinity or ammonia content of the mixing the greater must be the formaldehyde excess to produce a definite gel in a given time at room temperature, or in other words, for the same excess of formaldehyde the gelling time varies with the alkalinity value at the moment of adding the formaldehyde.

To gel by the addition of formaldehyde a non-compounded latex having an alkalinity exceeding 0.05% concentrated by a centrifugal process, it has been found necessary to add a small amount of a sensitizing agent to such latex, such as ammonium sulphate. This addition leads to little change taking place in the latex. The addition to such latex of sufficient formaldehyde to neutralize the free ammonia content and to form a gel a short time after such an addition also gives little immediate outward change in the state of the latex, the latex being still quite mobile, but at the end of this period thickening sets in, the mass finally setting to a strong uniform gel. An addition of excess of formaldehyde, however, leads to the speeding up of the gelling process.

The sensitizers are found to be such electrolytes as zinc sulphate, ammonium sulphate, ammonium chloride and also the ammonium salts of such organic acids as oxalic, tartaric and citric. These sensitizing agents are only added in such amounts that no pronounced physical change takes place in the strongly alkaline latex before the addition of the formaldehyde, but on such an addition gelling sets in at room temperature in a short space of time. If, however, the ammonia content is low thickening may take place after the addition of the sensitizer, but gelling does not occur until after the addition of the formaldehyde.

It has been observed that for a certain maximum addition of formaldehyde the ammonium salts of the organic acid, such as ammonium oxalate, must be within certain limits to produce the required gelling upon the addition of this quantity of formaldehyde. Amounts of salts above or below this quantity give only elastic pastes unless the quantity of formaldehyde is materially increased. Similar results have been obtained with latex mixings, but smaller amounts of sensitizers and a smaller excess of formaldehyde are required to produce the same strength of gel.

The emulsions or dispersions comprise by way of example, those consisting of or containing rubber, gutta-percha, balata or similar vegetable resins, occurring naturally or artificially obtained and in vulcanized or unvulcanized condition. Aqueous dispersions of coagulated rubber, vulcanized rubber, synthetic rubber, waste or reclaim may also be employed if desired as alternatives or admixtures. Any of the aforesaid dispersions may contain the usual known compounding ingredients and/or may be in concentrated form. Concentrates such as are obtained in Patent No. 1,846,164, February 23, 1932, to which may be added any one or more of the usual compounding ingredients, may also be used.

Examples of latex mixings are as follows:—

Example 1

Latex concentrated to 60% rubber content by a centrifuging process, having an alkalinity of 0.1% free ammonia, is compounded to give the following composition:—

| | Parts by weight |
|---|---|
| Rubber | 100 |
| Sulphur | 3 |
| Zinc oxide | 1 |
| Accelerator | 0.5 |
| Anti-ager | 3 |
| Mineral oil | 3 |

To this latex mixing excess of formaldehyde is added. It has been found that 20 cc. of formaldehyde solution (15% by weight of formaldehyde in strength) per litre of latex mixing in excess of that required to neutralize the free ammonia, leads to the gelling of such a latex mixing in 16 minutes at room temperature.

Example 2

Latex concentrated to 60% rubber content by a centrifuging process preserved with 0.38% ammonia is compounded to give the following composition:—

| | Parts by weight |
|---|---|
| Rubber | 100 |
| Sulphur | 3 |
| Accelerator | 0.5 |
| Zinc oxide | 1 |
| Anti-ager | 3 |
| Oil | 3 |

To this latex mixing a 5% solution of zinc sulphate crystals is added so that the amount of zinc sulphate in the latex mixing is 2 grams, per litre. Subsequent to the addition of this sensitizer 20 cc. of formaldehyde solution (15% by weight of formaldehyde in strength) is added per litre of the latex mixing in excess of that required to neutralize the free ammonia present. This latex mixing treated in such a manner has been found to gel in 32 minutes at room temperature.

Example 3

To a latex mixing prepared as in Example 2, 1 gram of ammonium oxalate is added per litre of latex mixing in the form of a 5% solution of ammonium oxalate. The subsequent addition thereto of 20 cc. formaldehyde solution (15% strength) per litre of latex in excess of that required to neutralize the free ammonia present, leads to the gelling of the latex to take place within 15 minutes.

We claim:—

1. A process of making a gelling rubber composition from preserved latex which comprises reducing the ammonia content in said latex, and then adding formaldehyde in quantity equal to 3/10ths of 1% of said latex above the amount required to remove any free alkalinity in said latex.

2. A process of making a gelling rubber composition from preserved latex which comprises reducing the ammonia content of said latex in the presence of a sensitizer, and adding formaldehyde in quantity equal to 3/10ths of 1% of said latex above the amount required to remove any free alkalinity in said latex.

3. The process of claim 2 in which an ammonium salt is used as a sensitizer.

4. The process of claim 2 in which a sulphate is used as a sensitizer.

5. The process of claim 2 in which ammonium sulphate is used as a sensitizer.

6. A process of making a gelling rubber composition from preserved latex which comprises reducing the ammonia content of a 60% rubber latex to about 1/10th of 1% of free ammonia, and adding formaldehyde in excess of that required to combine with said ammonia, said excess being as high as 3/10ths of 1% of said latex.

7. A process of making a gelling rubber composition which comprises adding to an ammonia preserved compounded 60% rubber latex a zinc sulphate solution in amount to equal about two grams of zinc sulphate per litre of latex, and adding a formaldehyde solution equal to 3/10ths of 1% of said latex above that required to combine with the free ammonia of said latex.

8. A process of making a gel of latex which comprises adding to a concentrated preserved latex a small quantity of a sensitizing agent and formaldehyde in excess of that required to combine with the free ammonia in said latex, said excess equal to 3/10ths of 1% of said latex, and permitting said latex to stand until a gel is formed.

9. The process of making a gelling rubber composition from preserved uncompounded latex which comprises reducing the ammonia content of a 60% rubber latex to not above 1/20th of 1% of free ammonia, and adding formaldehyde in excess of that required to combine with said ammonia, said excess being as high as 3/10ths of 1% of said latex.

In witness whereof, we have hereunto signed our names.

CECIL HAYES.
EVELYN WILLIAM MADGE.
FREDERICK HENRY LANE.